No. 686,033. Patented Nov. 5, 1901.
H. DEERING.
HAND TRUCK.
(Application filed July 16, 1901.)
(No Model.)
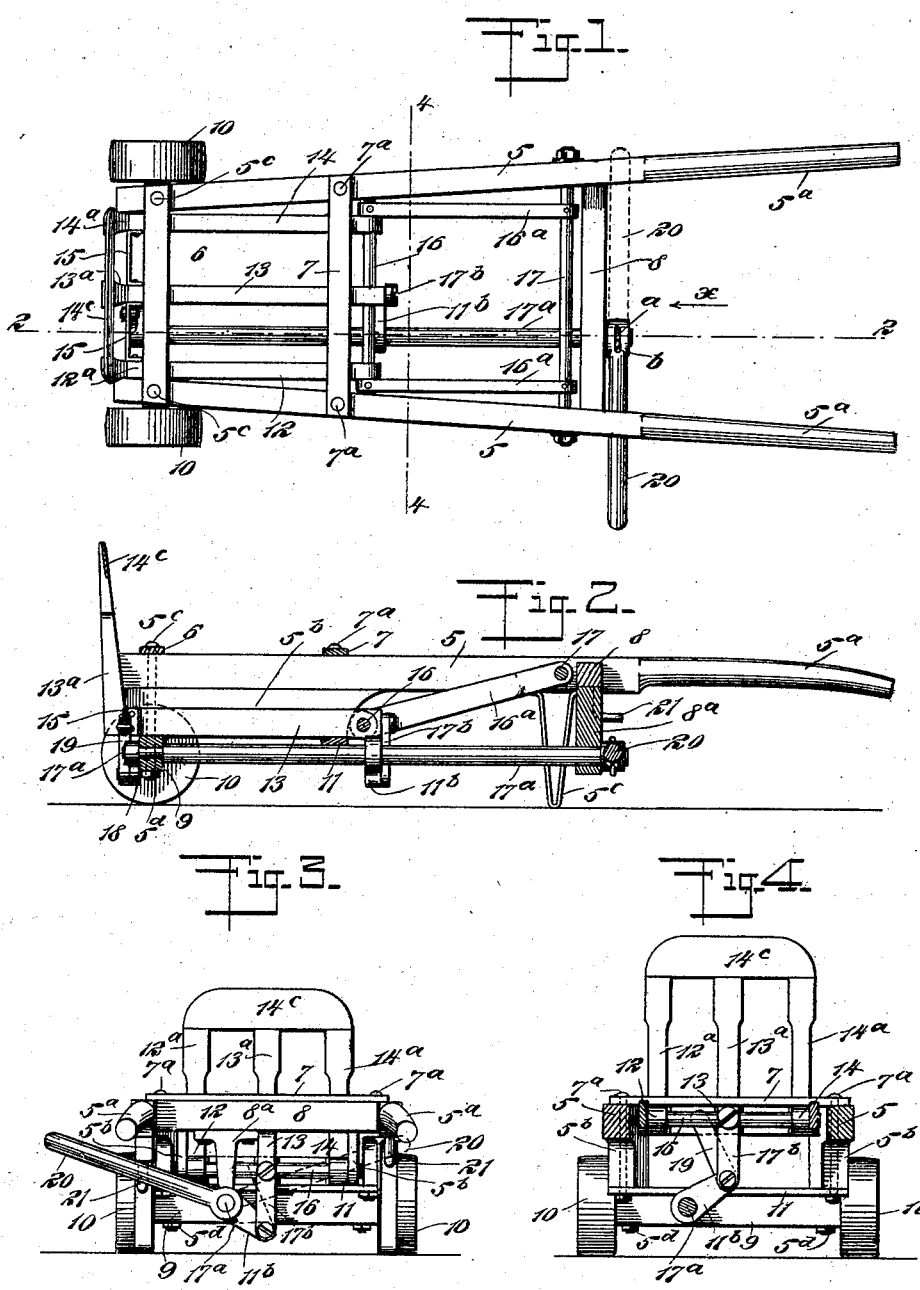
WITNESSES:
INVENTOR
Henry Deering.
BY
ATTORNEYS
THE NORRIS PETERS CO., PHOTO-LITHO., WASHINGTON, D. C.

UNITED STATES PATENT OFFICE.

HENRY DEERING, OF MINNESOTA CITY, MINNESOTA.

HAND-TRUCK.

SPECIFICATION forming part of Letters Patent No. 686,033, dated November 5, 1901.

Application filed July 16, 1901. Serial No. 68,460. (No model.)

*To all whom it may concern:*

Be it known that I, HENRY DEERING, a citizen of the United States, and a resident of Minnesota City, in the county of Winona and State of Minnesota, have invented a new and Improved Hand-Truck, of which the following is a full, clear, and exact description.

This invention relates to hand-trucks used for the transfer of goods and bagged material from point to point, and has for its object to provide a hand-truck with novel features of construction that adapt it for the reception and movement of large loads and their dumping discharge in a proper manner, the construction being such as to permit an adjustment of said parts to adapt the truck for ordinary use.

The invention consists in the novel construction and combination of parts, as is hereinafter described, and defined in the appended claims.

Reference is to be had to the accompanying drawings, forming a part of this specification, in which similar characters of reference indicate corresponding parts in all the figures.

Figure 1 is a plan view of a truck embodying the features of invention. Fig. 2 is a sectional side view substantially on the line 2 2 in Fig. 1. Fig. 3 is an end view seen in the direction of the arrow $x$ in Fig. 1, and Fig. 4 is a transverse sectional view substantially on the line 4 4 in Fig. 1.

The frame of the truck consists of the side bars 5 5, held spaced apart and properly divergent toward the handle portions $5^a$ thereon by the cross-bars 6, 7, and 8, that are firmly secured at their ends to the side bars at suitable points, and these cross-bars may be covered with a plank floor, if preferred. The side bars 5 at and near their forward ends are downwardly extended, as at $5^b$, to provide bracket-blocks thereon, and said extensions may be formed integrally with the side bars or be affixed upon the lower faces of the side bars, as shown in Fig. 2.

An axle 9 is extended transversely upon the bracket-blocks $5^b$ near the front of the truck-frame and is thereto secured by bolts $5^c$, which extend down through the ends of the cross-bar 6, the side bars 5, and the axle 9, a nut $5^d$ on the lower end of each bolt clamping said parts together, as shown in Figs. 2 and 4, the projecting ends of the axle affording spindles (not shown) whereon two broad-faced truck-wheels 10 are held to rotate as usual, and thus afford support to and means for progressively moving the truck.

A brace-bar 11 is secured by its ends upon the bracket-blocks $5^b$ near their forward ends, said bar being disposed parallel to and in the same horizontal plane with the axle 9. The brace-bar 11 is positioned directly below the cross-bar 7 and is connected therewith by the upright clamping-bolts $7^a$, which pass through the cross-bar 7, the side bars 5, the extensions $5^b$, and the brace-bar 11, the bolts having heads on their upper ends and nuts on their lower ends, as shown in Figs. 2 and 4.

Near the rear cross-bar 8 of the truck-frame two similar legs $5^e$ are secured, respectively, upon the lower sides of the side bars 5, said legs having such height as will dispose the upper side of the truck-frame level when the legs are rested upon a floor or platform.

An elevator-frame, which is an essential feature of the invention, is forwardly positioned on the truck-frame and between the cross-bars 6 7 and brace-bar 11 thereof. The elevator-frame comprises three similar metal bars 12 13 14, that are held in parallel planes and spaced apart by the metal knee-brackets 15 15, which are secured between their forward ends, as shown in Fig. 1, the rear ends of said bars being loosely held spaced apart by the stay-bar 16, as shown clearly in Fig. 1.

Upon the front ends of the elevator-frame bars 12 13 14 posts $12^a$ $13^a$ $14^a$ are respectively secured by their lower ends, and said posts, that are slightly inclined forward, have sufficient height to permit their projection above the cross-bar 6 a proper distance when the bars 12 13 14 are seated upon the axle 9 and brace-bar 11. Upon the upper ends of the posts $12^a$ $13^a$ $14^a$ a plate $14^c$ is secured, and it will be seen that the posts and plate together afford a skeleton wall for the support of baggage or bagged material which may be loaded upon the truck, this portion of the device constituting the nose of the truck.

Two link bars $16^a$ of equal length are provided, the forward ends of which are affixed upon the bar 16 and the rear ends of which are attached to a fulcrum-rod 17, held to rock at its ends in or on the side bars 5 near the rear cross-bar 8, as shown clearly in Fig. 1. Upon the cross-bar 8 a bracket-arm 8ª is secured by one end so as to project downwardly and at the lower end affords a bearing for the rear end of a rock-shaft 17ª, which extends toward the axle 9 and is journaled on or in the same.

A rock-arm 18 is secured by one end upon the forward end of the rock-shaft 17ª, that extends forwardly of the axle 9, and upon the lower end of this rock-arm the lower end of a link 19 is pivoted, the upper end of said link being held to rock upon one of the knee-brackets 15.

On the rock-shaft 17ª a rock-arm 11ᵇ is secured, that is the duplicate of the rock-arm 18 and is disposed in the same downwardly-inclined plane therewith. Upon the lower end of the rock-arm 11ᵇ the depending end of a link 17ᵇ is pivoted, and said link, which is similar to the link 19, is pivoted at its upper end upon the extremity of the central elevator-frame bar 13.

Upon the end of the rock-shaft 17ª, that projects beyond the bracket-arm 8ª, a lever 20 is held to rock a limited distance by means of peripheral slots $a$, formed in the hub of the arm, and pins $b$, which project from the rock-shaft and bear in these slots. The lever 20 when the pins $b$ engage with appropriate ends of the slots $a$ is adapted to rock the shaft 17ª sufficiently to fully lower the elevator-frame, as shown in Figs. 2 and 3, the lever being supported below the left handle 5ª by its engagement with an L-shaped bracket-arm 21, which depends from said handle. If the lever 20 is rocked toward the right-hand side bar 5 while the rear portion of the truck is raised from the floor, the elevator-frame will be moved upwardly and reach its full elevation when the lever is in contact with the handle 5ª of said frame-bar and may be retained so adjusted by the engagement of the lever with the bracket-arm 21 from said handle-bar, as indicated in Fig. 3.

In use the truck if it is to be heavily loaded should be adjusted by movement of the lever 20, as shown by full lines in Fig. 3, so as to fully raise the elevator-frame and nose thereon, which will provide convenient and reliable room on the truck for the carrying of quite a high load, which may be readily dumped in proper position if the handle-bars of the truck are elevated and the lever 20 rocked in an opposite direction, so as to lower the nose of the elevator-frame. When the elevator-frame is not required for service, the lever 20 may be positioned as shown in Fig. 3 by dotted lines, which will lower the elevator and adapt the truck for use when ordinary loads are to be carried thereon.

It will be seen that the peculiar construction and arrangement of parts provide a strong, shapely, and easily-handled truck which may quickly be converted from a truck of ordinary capacity into one which will receive and safely carry a high load and by manipulation of parts may be readily dumped at a desired point, and if the stuff hauled on the truck is bagged material, such as grain or the like, the bags may be deposited on a platform or floor in the same order they occupied on the truck.

Having thus described my invention, I claim as new and desire to secure by Letters Patent—

1. The combination with a truck-frame, an axle at the front end thereof, wheels on the axle, and depending legs on the side bars of the truck-frame, of a shaft held to rock longitudinally on the truck-frame, an elevator-frame between the side bars of the truck-frame, a high nosepiece on the front end of the elevator-frame, rock-arms on the rock-shaft, links connecting the front and rear ends of the elevator-frame with the respective rock-arms, and means to rock the rock-shaft.

2. The combination with a truck-frame, an axle at the front end thereof, wheels on the axle, depending legs on the side bars of the truck-frame, depending bracket-blocks at the front ends of the side bars, the axle being secured thereon, and a brace-bar secured by its ends on the rear ends of the bracket-blocks, of a skeleton elevator-frame between the bracket-blocks of the truck-frame, links pivoted upon the rear end of the elevator-frame and also upon the side bars of the truck-frame, a rock-shaft extended longitudinally of the truck-frame and journaled near its ends respectively on the axle and on a depending arm at the rear of the truck-frame, two like rock-arms on the rock-shaft near the respective ends of the elevator-frame, links connecting the rock-arms with said ends of the elevator-frame, and a lever at the rear end of the rock-shaft, which by manipulation will adjust the parts to elevate or lower the elevator-frame.

In testimony whereof I have signed my name to this specification in the presence of two subscribing witnesses.

HENRY DEERING.

Witnesses:
R. J. KRUGMIRE,
J. W. STACKHOUSE.